(12) United States Patent
Bozic

(10) Patent No.: US 10,519,987 B2
(45) Date of Patent: Dec. 31, 2019

(54) PRESSURE LIMITING DEVICE, IN PARTICULAR FOR AN ASSIST SYSTEM FOR VEHICLES

(71) Applicant: POCLAIN HYDRAULICS INDUSTRIE, Verberie (FR)

(72) Inventor: Ante Bozic, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/748,150

(22) PCT Filed: Jul. 27, 2016

(86) PCT No.: PCT/EP2016/067945
§ 371 (c)(1),
(2) Date: Jan. 26, 2018

(87) PCT Pub. No.: WO2017/017154
PCT Pub. Date: Feb. 2, 2017

(65) Prior Publication Data
US 2018/0223879 A1 Aug. 9, 2018

(30) Foreign Application Priority Data

Jul. 28, 2015 (FR) ..................................... 15 01623

(51) Int. Cl.
F15B 13/02 (2006.01)
F16H 61/4017 (2010.01)
F16H 61/4078 (2010.01)
F16K 17/06 (2006.01)
F16K 17/04 (2006.01)
(Continued)

(52) U.S. Cl.
CPC ....... F15B 13/024 (2013.01); F16H 61/4017 (2013.01); F16H 61/4078 (2013.01);
(Continued)

(58) Field of Classification Search
CPC ..................................................... F15B 13/024
See application file for complete search history.

(56) References Cited

U.S. PATENT DOCUMENTS 3,748,859 A 7/1973 Pruvot
4,520,625 A 6/1985 Sato et al.
(Continued)

FOREIGN PATENT DOCUMENTS

FR 2130805 A5 11/1972
FR 2996176 A1 4/2014

OTHER PUBLICATIONS

Preliminary Research Report received for French Application No. 1501623, dated Jun. 15, 2016, 2 pages (1 page of French Translation Cover Sheet and 1 pages of original document).
(Continued)

Primary Examiner — Marina A Tietjen
Assistant Examiner — Frederick D Soski
(74) Attorney, Agent, or Firm — Womble Bond Dickinson (US) LLP

(57) ABSTRACT

The invention relates to a pressure-limiting device designed to be installed in a system comprising a first line (11) and a second line (12) that can comprise pressurised oil, as well as comprising a discharge and/or booster line (10). The device also comprises a pressure selector (130, 150) in the form of a cage defining two seats (132, 134) and two pressure relief valves (160, 180). The limiting device is characterised in that it further comprises at least one means (170, 172; 190, 192) for regulating a pressure relief valve, disposed on the outside of an axial end of the pressure selector (150), in the form of a cage that allows the loading of the associated pressure relief valve to be regulated.

9 Claims, 8 Drawing Sheets

Figure 1:
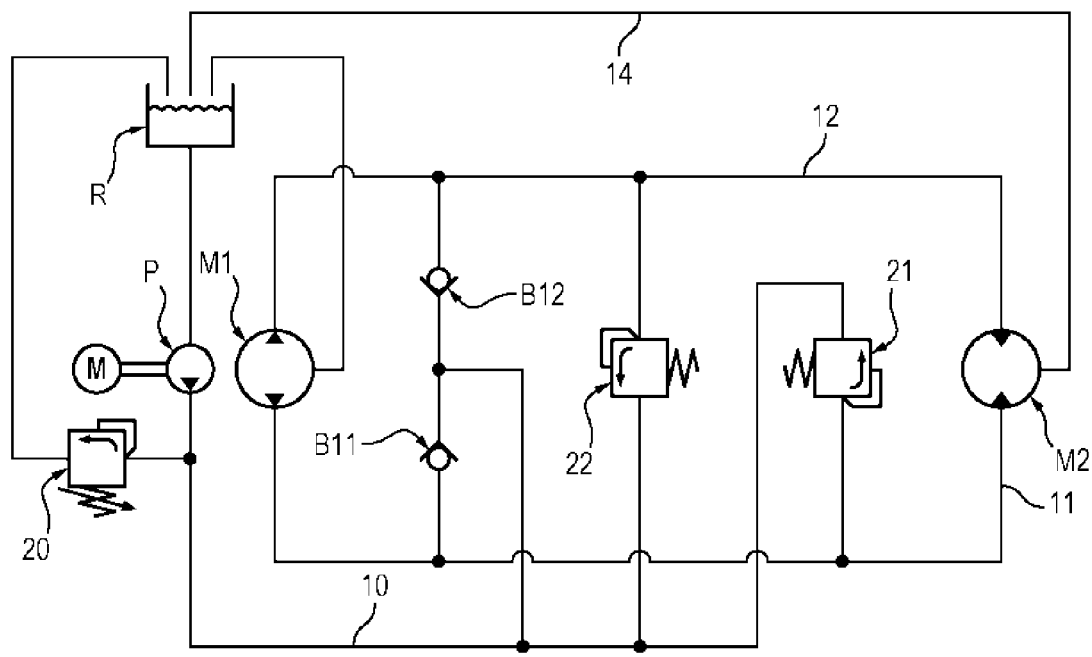

(51) Int. Cl.
*F15B 7/00* (2006.01)
*F15B 21/00* (2006.01)

(52) U.S. Cl.
CPC ............ *F16K 17/044* (2013.01); *F16K 17/06* (2013.01); *F15B 7/006* (2013.01); *F15B 7/008* (2013.01); *F15B 21/005* (2013.01); *F15B 2211/20561* (2013.01); *F15B 2211/27* (2013.01); *F15B 2211/3052* (2013.01); *F15B 2211/50518* (2013.01); *F15B 2211/50527* (2013.01); *F15B 2211/515* (2013.01); *F15B 2211/5159* (2013.01); *F15B 2211/522* (2013.01); *F15B 2211/61* (2013.01); *F15B 2211/611* (2013.01); *F15B 2211/613* (2013.01); *Y10T 137/7838* (2015.04)

(56) References Cited

U.S. PATENT DOCUMENTS

| | | | |
|---|---|---|---|
| 6,499,296 | B1 | 12/2002 | Weickert et al. |
| 2005/0097887 | A1 | 5/2005 | Landhuis |
| 2011/0240897 | A1* | 10/2011 | Gepraegs .............. F15B 13/024 251/282 |
| 2015/0251533 | A1 | 9/2015 | Heren et al. |
| 2016/0160885 | A1* | 6/2016 | Takao ................... F15B 13/021 137/512 |
| 2017/0067569 | A1* | 3/2017 | Ballenger ........... F15B 13/0405 |
| 2019/0032681 | A1* | 1/2019 | Geissler ............. F15B 13/0402 |

OTHER PUBLICATIONS

International Search Report and Written Opinion received for PCT Patent Application No. PCT/EP2016/067945, dated Aug. 30, 2016, 14 pages (7 pages of English Translation and 7 pages of Original Document).

International Preliminary Report on Patentability received for PCT Patent Application No. PCT/EP2016/067945, dated Feb. 8, 2018, 12 pages (7 pages of English Translation and 5 pages of Original Document).

* cited by examiner

PRESSURE LIMITING DEVICE, IN PARTICULAR FOR AN ASSIST SYSTEM FOR VEHICLES

GENERAL TECHNICAL FIELD

The invention relates to the management of excess pressures of hydraulic circuits, and more particularly to the devices of the "pressure limiter" or "protection valve" type.

The invention applies in particular to hydraulic assistance circuits for a vehicle.

Hydraulic assistance is carried out by means of hydraulic machines which can supply a torque to driving wheels. These machines transform hydraulic energy of oil under pressure into mechanical energy, or the reverse.

PRIOR ART

In a vehicle, a first hydraulic machine M1 is mounted on the front axle and a second hydraulic machine M2 is mounted on the rear axle. What is meant by machines is that they can operate as a motor or as a pump. Generally, one of the machines is assigned to a mechanically driven axle, while the other is assigned to a carrying axle.

The configuration shown corresponds to a "bicycle chain" (document FR2996176), that is that in its main use, the first machine M1 acts as a pump for the second machine M2, which acts as a motor.

The vehicle generally comprises a heat engine (not shown in the figures) which drives, directly or indirectly, the first hydraulic machine M1 through a mechanical connection. The second machine M2 is connected to the carrying wheels of the vehicle. In this manner, in the event that the mechanically driven wheels skid, the machine M1 can transfer torque to the carrying wheels connected to the machine M2. There can be several machines M1 or M2 on several axles.

To this end, the delivery of the first machine M1 is connected to the admission of the second machine M2 by a line 11, called a high-pressure line, and the delivery of the second machine M2 is connected to the intake of the first machine M1 by a line 12 called a low-pressure line.

The terms high and low pressure correspond to use in forward motion with torque addition ("main use").

Consequently, as pressures can be reversed, the terms first line 11 and second line 12 are preferred.

The first and the second line 11, 12, operate in a closed circuit and can be subjected to excess pressure which can damage the machines M1, M2 or the seals present on the circuit. They define a closed loop.

As an example, the pressures are on the order of 400 bars in one line and a few tens of bars, a boost pressure at least, in the other line.

To protect the hydraulic circuit and in particular the first and second lines 11, 12, it is known to dispose two pressure limiters.

FIG. 1 shows a first variant of the prior art: a pressure limiter 21 is disposed between the first line 11 and a booster line 10, another limiter 22 is disposed between the second line 12 and the booster line 10.

Each limiter 21, 22 can be calibrated to the desired value. The booster line 10 is a line allowing a booster pump P, actuated by a motor M, typically an electric motor, which creates an electro-pump unit, to supply with oil the first and second lines 11, 12 through check valves B11, B12 so as to activate the hydraulic assistance. Due to a pressure limiter 20 in parallel with the pump P, the booster circuit 10 allows the discharge of excess pressure.

This solution uses two protection members (the pressure limiters 21, 22).

Figure 2:
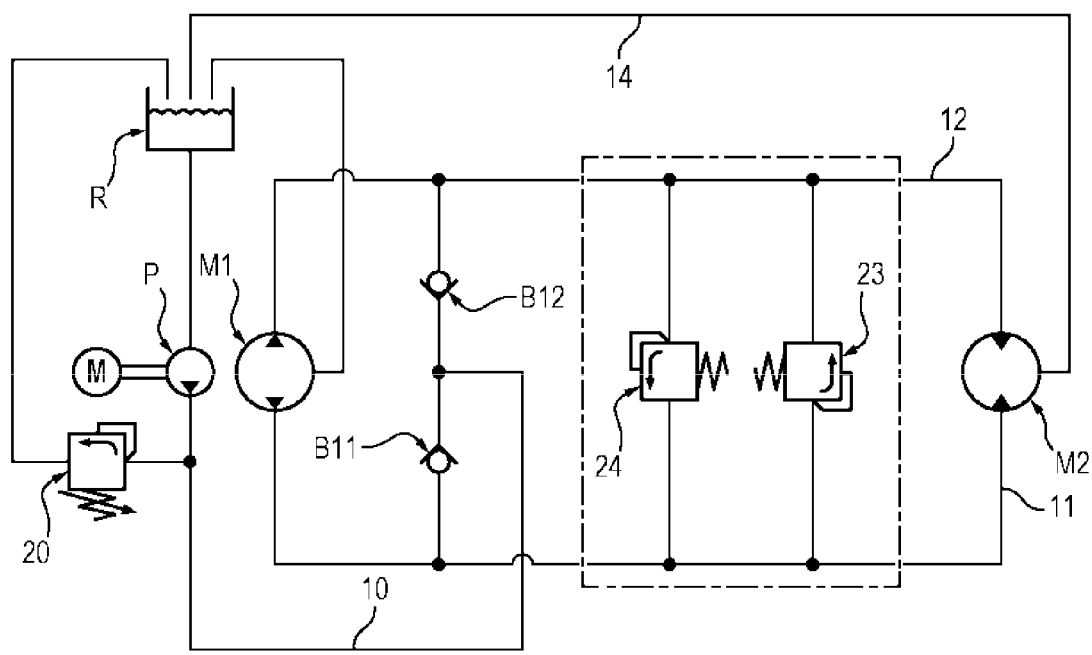

FIG. 2 shows a second variant of the prior art: there are still two limiters 23, 24 disposed as before, except that each dumps the excess pressure into the other line of the first and second lines 11, 12. One line always having a lower pressure, it can tolerate the excess pressure present in the other.

This solution also uses two protection members (the pressure limiters 23, 24). Also found again in FIG. 2 are two check valves B11, B12 which are used for boosting.

Figure 3:
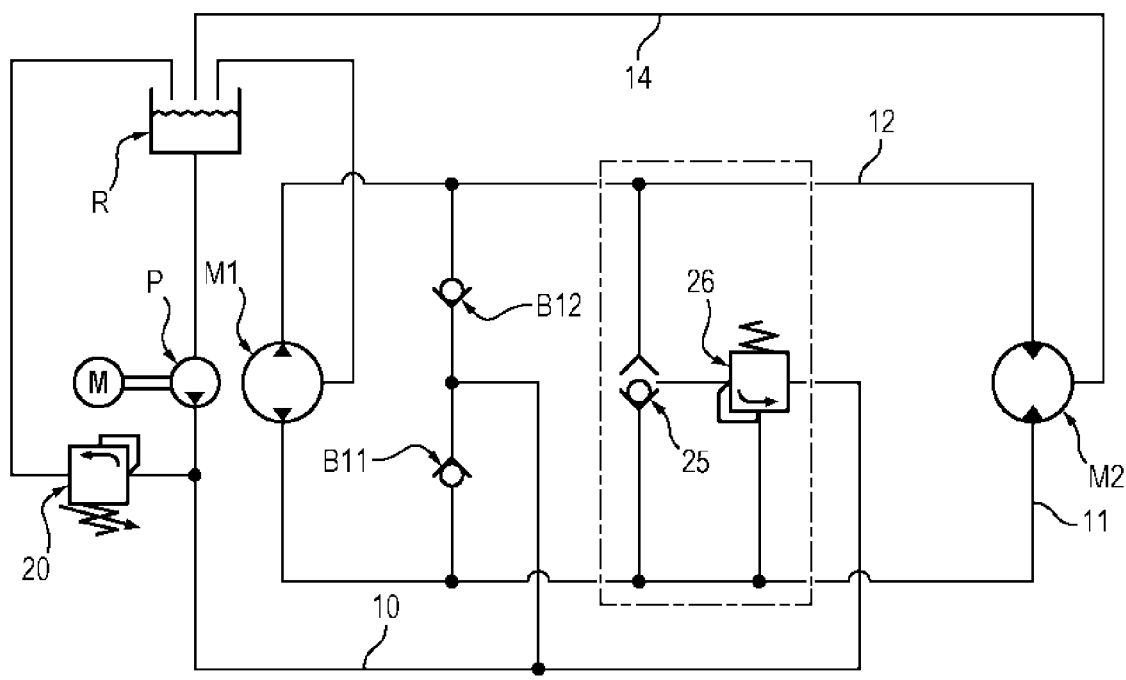

FIG. 3 shows a third variant of the prior art: A high-pressure selector 25 selects the line with the higher pressure among the first and the second line 11, 12 and sends it to the booster line 10 via a pressure limiter 26. In this manner, a limiter is eliminated but a circuit selector 25 must be added.

This solution also uses two protection members. Also found again in FIG. 3 are two check valves B11, B12 which are used for boosting.

Also described in document US 2005/0097887 is another variant of a pressure relief device comprising a pressure selector in the form of a cage associated with two pressure relief valves. During normal operation, the pressure selector allows a connection between a booster line and a low-pressure supply line. In the event of excess pressure on one line, the associated pressure relief valve opens and allows discharge of the excess pressure to the booster line.

The devices previously describe have already made significant contributions.

Nevertheless, they are not always satisfactory.

Figure 4:
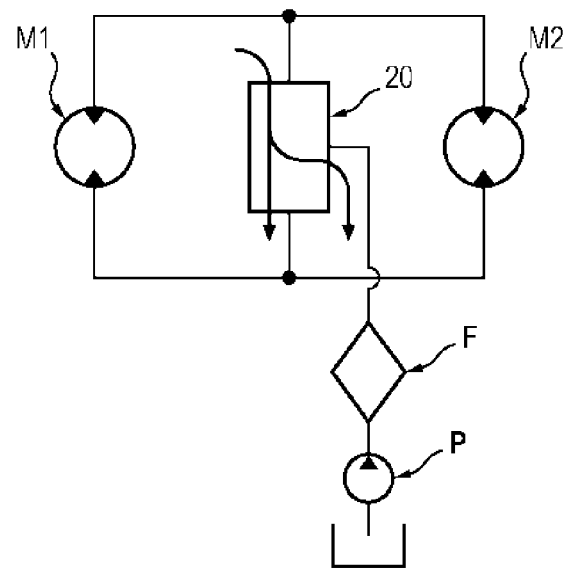

As has been shown schematically in FIG. 4, in the event of skidding of a wheel associated with one of the motors, an increase in pressure of the line theoretically at low pressure can be observed, due to the opening of an associated pressure relief valve 20 which short-circuits the motor in question, with the possibility of a pressure rise on both lines 11, 12 as well as, if applicable, on the booster line 10, hence the risk of deterioration of the booster pump P, or of an associated filter F. This risk also exists in the case of an installation comprising two machines M1, M2 associated respectively with two axles as can be seen in FIG. 4.

In this context, the invention has as its objective to propose a new pressure relief device which makes it possible to improve pressure control, while still allowing the effect of selecting the line to be connected to the booster device.

The present invention also has as its object to propose a pressure relief device which optimizes the space available and reduces the costs of manufacture, with simple members.

PRESENTATION DE L'INVENTION

For this purpose, the invention proposes a pressure relief device suitable to be installed in a system comprising a first line and a second line which can comprise oil under pressure and comprising a discharge and/or booster line, which device comprises a pressure selector in the form of a cage defining two seats and two pressure relief valves, characterized in that the device further comprises at least one adjustment means of a pressure relief valve, disposed on the outside of an axial end of the pressure selector in the form of a cage to allow adjustment of the calibration of the associated pressure relief valve.

As will be understood hereafter, the use of a selector comprising a cage on the ends of which are formed the respective shutters of the two selection valves, allows a constant distance between these two shutters to be guaranteed and consequently allows a guarantee that when one of the selection valves is closed, the other selection valve is automatically opened.

According to one advantageous feature of the invention, the device comprises adjustment means respectively of each pressure relief valve disposed on the outside of the axial ends of the pressure selector in the form of a cage to allow independent adjustment of the calibration of each pressure relief valve.

The pressure relief occurs from now using a single device, which improves the compactness of the system as well as its cost of manufacture, with respect to certain known solutions of the prior art.

The invention also relates to assistance systems and vehicles equipped with a pressure relief device conforming to the invention.

PRESENTATION OF THE FIGURES

Figure 5:
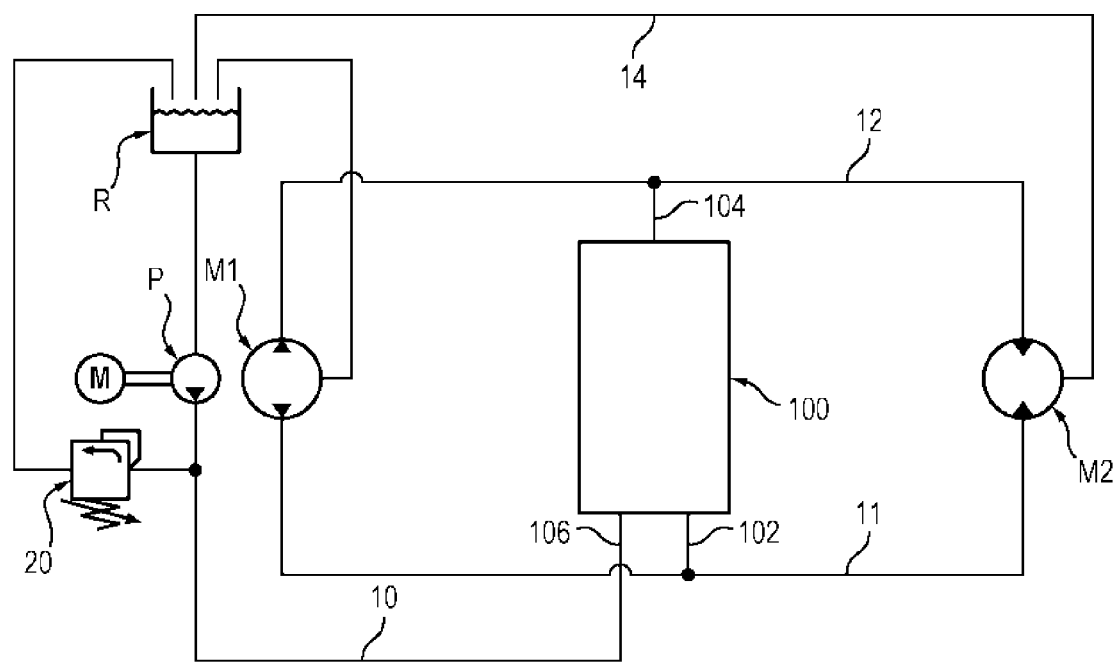

Other features, aims and advantages of the invention will be revealed from the description that follows, which is purely illustrative and not limiting, and which must be read with reference to the appended drawings, in which:

FIGS. 1 to 3 show variants of the prior art,

FIG. 4 shows schematically the risk of a rise in pressure on a low-pressure line in the event of skidding of a wheel associated with a motor, FIG. 5 shows schematically an assistance circuit integrated a pressure relief device 100 conforming to the invention which integrates means which carry out the function of a pressure selector and of two limiters 21 and 22 or 23, 24 or 25, 26 shown in FIGS. 1 to 3, FIG. 6 shows schematically the structure of a device conforming to the invention, and FIGS. 7, 8, 9 and 10 show the same device in four operating states.

DETAILED DESCRIPTION

FIG. 5 shows a system conforming to the invention integrating a pressure relief device 100 conforming to the invention which integrates means which carry out the function of a pressure selector and of two pressure limiters.

The device 100 comprises three ports 102, 104, 106: two ports 102, 104 which communicate respectively with the lines 11 and 12 and a port 106 which communicates with the booster line 10.

The booster line can be supplied with oil by the booster pump P until it reaches the boost pressure, which makes the machines M1 M2 operational, or the booster line can be aspirated by the booster pump, which makes the machines M1 M2 non-operational. The machines M1 and M2 are of a type which becomes non-operational or disengageable below a pressure threshold in the lines 11 and 12. The selector automatically connects the line with the lower pressure to boost, which allows activation or deactivation of the transmission, which are flexible and orderly.

Figure 6:
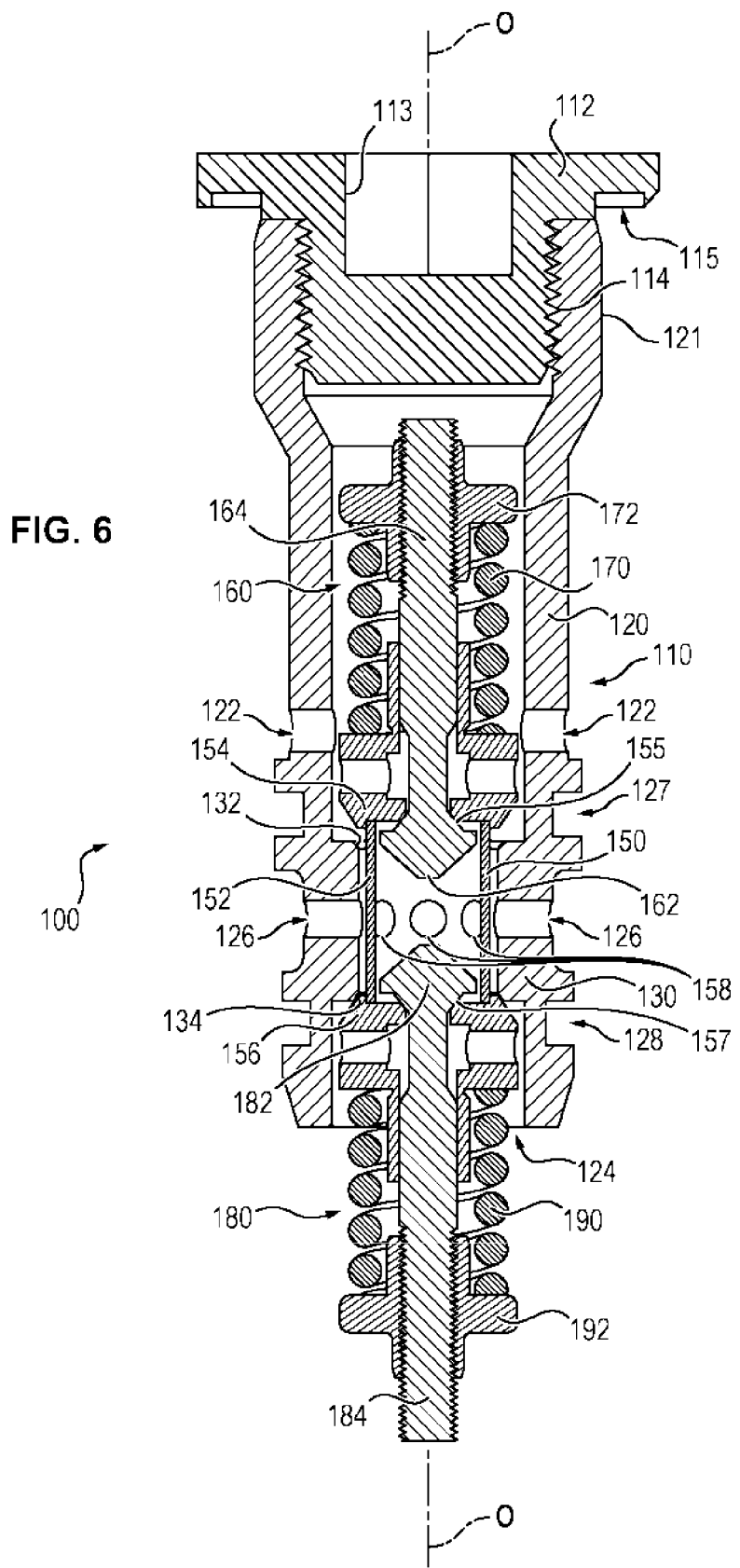

The pressure relief device 100 shown in FIG. 6 comprises essentially a body 110, a selector in the form of a cage 150 and two pressure relief valves 160, 180.

The device 100 is centred on a longitudinal axis of symmetry O-O. The device 100 is rotationally symmetric overall around the axis O-O.

The body 110 is formed of a cartridge suitable for being integrated into any support structure, for example on the casing of a hydraulic motor.

The body 110 is preferably formed by assembling a casing 120 and a plug 112. The plug 112 can be attached to an axial end of the casing 120 by any appropriate means, for example by crimping or preferably by screwing of the complementary threads 114. The plug 112 can be equipped with shape 113 that is not a cylinder of revolution allowing its tightening, as well as a groove 115 suitable for receiving a fluid-tight seal in contact with the support structure. The axial end of the casing 120 can be equipped on its exterior surface with a thread 121 allowing the assembly of the device 100 on this support structure.

The casing 120 comprises at least three through passages 122, 124, 126 which correspond to the three aforementioned ports 102, 104, 106.

One of the through passages 126 is formed in the median portion of the length of the casing 120 and corresponds to the port 106. More precisely, preferably, several orifices 126 are provided evenly distributed around the axis O-O forming the port 106.

The passages 122 and 124 are formed respectively on either side of the median passage 126. More precisely, preferably, the passage 122 is formed from several orifices 122 evenly distributed around the axis O-O forming the port 102.

The passage 124 can also be formed from several orifices evenly distributed around the axis O-O forming the port 104. However, according to the preferred embodiment, for reasons of manufacture and assembly, the passage 124 is formed from an orifice which leads axially to the casing 120 at the end opposite to the plug 112.

The casing 120 preferably comprises on its exterior surface two annular grooves 127, 128 intended to receive respective seals in contact with the support structure allowing the hydraulic connections provided toward the passages 122, 126 and 124 to be mutually isolated.

The casing 120 comprises, on its inner surface and at the median passage 126, a narrowed portion 130 which extends axially to either side of the passage 126. The narrowed portion 130 defines respectively on its two axial ends two seats 132, 134 associated with the selector 150.

The narrowed portion 130 which forms the two seats 132, 134 can be formed integrally on the inner surface of the casing 120 or be formed from a separate part applied to the surface of the casing 120 and attached by any appropriate means, for example by crimping.

The two seats 132, 134 are oriented respectively toward the axial ends of the casing 120.

The selector 150 has the shape of a diabolo formed from a central cylinder 152 with a constant cylinder of revolution cross-section provided on its two axial ends with respective protrusions 154, 156 protruding on its outer surface.

The protrusions 154, 156 respectively form two annular shutters, directed respectively toward the median portion of the diabolo 150, suitable for cooperating with the seats 132, 134 formed on the casing 120.

The outside diameter of the central cylinder 152 is less than the inner diameter of the narrowed portion 130. The outer diameter of the shutters 154, 156, on the other hand, is greater than the diameter of the seats 132, 134.

Thus, when one of the shutters 154, 156 rests on the associated seat 132, 134, the corresponding valve of the selector 150 is closed. Conversely, when a shutter 154, 156 is separated from the associated seat 132, 134, the corresponding valve of the selector 150 is open.

The use of a selector 150 comprising a cage 152 on the ends of which are formed the respective shutters 154, 156 of two selection valves, makes it possible to guarantee a constant distance between these two shutters 154, 156 and consequently to make it possible to guarantee that, when one of the selection valves is closed, the other selection valve is automatically opened.

The cylinder 152 defines an axial through passage intended to slidably receive shutters 162, 182 and their associated support rods 164, 184 of the pressure relief valves 160, 180. The cylinder 152 also comprises a plurality of radial through orifices 158.

The orifices 158 also allow free filling of the inner volume of the selector 152 and the discharge of fluid during the opening of a pressure relief valve, as will be seen hereafter.

The aforementioned protrusions 154, 156 also protrude on the inner surface of the cylinder 152 to define two annular seats 155, 157 directed axially toward the median portion of the selector 150 and intended to cooperate respectively with the shutters 162, 182.

The shutters 162, 182 are formed with protrusions on one end of the rods 164, 184. The shutters are place on the inside of the seats 155, 157 in the volume of the inner chamber of the cylinder 152.

The rods 164, 184 emerge axially on each end of the selector 150. Each rod 164, 184 and its associated shutter 162, 182 is biased toward a respective axial end of the casing 120 by a respective spring 170, 190.

Thus, the shutters 162, 182 are urged respectively against the seats 155, 157.

The springs 170, 190 are interspersed on the rods 164, 184, between the protrusions 154, 156 and stops 172, 192 in the form of rings carried by the rods 164, 184.

Preferably, the stops 172, 192 are adjustable in position over the length of the rods 164, 184 to define the force exerted by each spring 170, 190 and consequently the calibration of the opening pressure of each pressure relief valve.

The stops 172, 192 can be attached in position on their respective rod 164, 184 by any appropriate means, for example by screwing or crimping.

The protrusions 154, 157 and the cylinder 152 are advantageously formed from at least two parts, preferably three parts, initially separate and assembled by any appropriate means, for example by screwing or crimping.

To assemble the pressure relief device previously described, the procedure is essentially as follows:

First of all, the shutters 162, 182 and their rods 164, 184 are assembled, equipped with springs 170, 190 and with stops 172, 192 on the respective protrusions 154, 156. The stops 172, 192 are adjusted in position for the desired calibration.

The pressure relief valve sub-assemblies thus formed are introduced into the casing 120, respectively by each end of it, and the protrusions 154, 156 are attached to the cylinder 152 of the selector.

To this end, the exterior surface of the cylinder of the selector can be equipped with gripping shapes accessible by the passages 126 to facilitate assembly.

Then, the plug 112 is attached to the end of the casing 120. The fluid-tight seals are placed in their respective grooves.

The operation of the relief device is essentially the following:

At rest, in the absence of pressure on the port 106 and therefore in the booster line 10 and consequently on the parts 102, 104 and therefore in the supply lines 11, 12, the selector 150 is capable of free movement in the casing 120 facing the seats 132, 134. The shutters 162, 182 biased by the springs 170, 190 rest on their respective seats 155, 157 and the pressure relief valves are consequently closed.

In operation, during activation of the booster pump P and selection of the direction of rotation of the machine M1, one of the ports 102, 104 is subjected to a high pressure while the other port 104, 102 is subjected to a low return pressure.

The selector 150 is thus urged by the high pressure.

Figure 7:
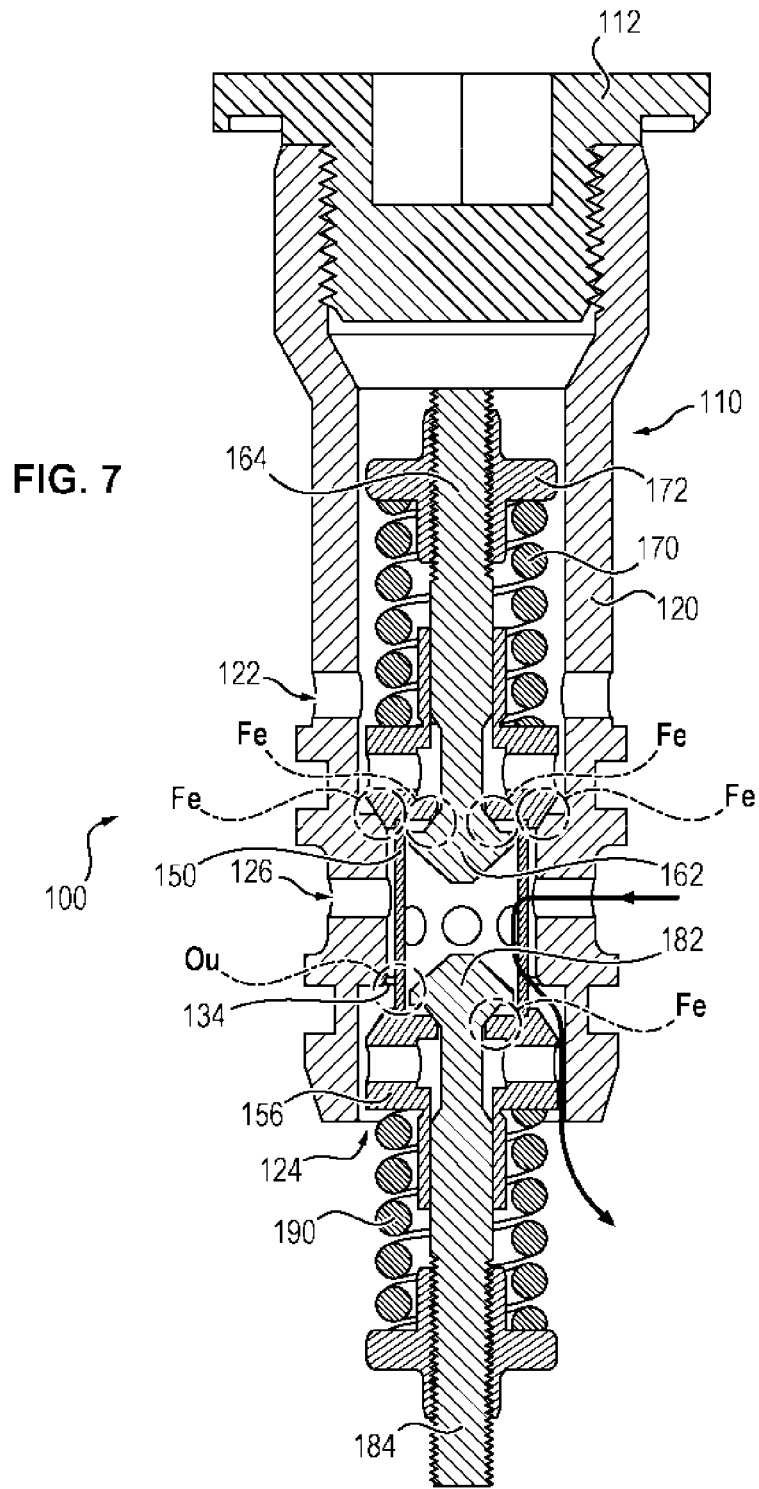

If, as illustrated in FIG. 7, the high pressure is applied to port 102 corresponding to the passage 122. The protrusion 154 of the selector 150 is urged in contact against the seat 132. The corresponding selection valve is closed. Conversely, a low pressure is applied to the port 104 corresponding to the passage 124. The protrusion 156 of the selector 150 is separated from the seat 134. The corresponding selection valve is open.

Figure 8:
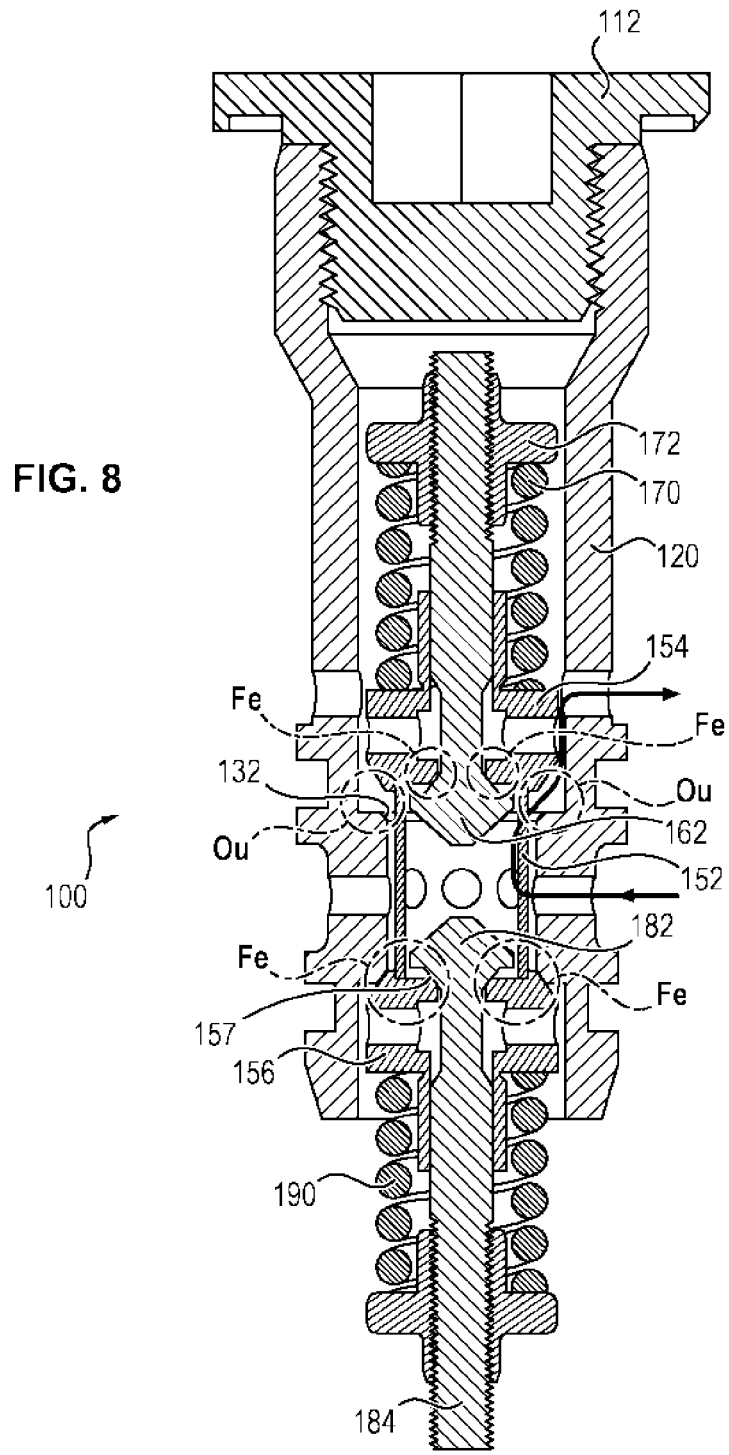

As can be seen in FIG. 8, in the case of a reversal of the direction of rotation, the high pressure is applied to port 104 corresponding to the passage 124. The protrusion 156 of the selector 150 is urged in contact against the seat 134. The corresponding selection valve is closed. Conversely, a low pressure is applied to port 102 corresponding to the passage 122. The protrusion 154 of the selector 150 is separated from the seat 132. The corresponding selection valve is open.

The operation of the selector is identical at the time of activation or of deactivation of the hydraulic machines, through the use of the booster pump in the sense of making oil enter into the closed loop or making oil leave the closed loop.

Figure 9:
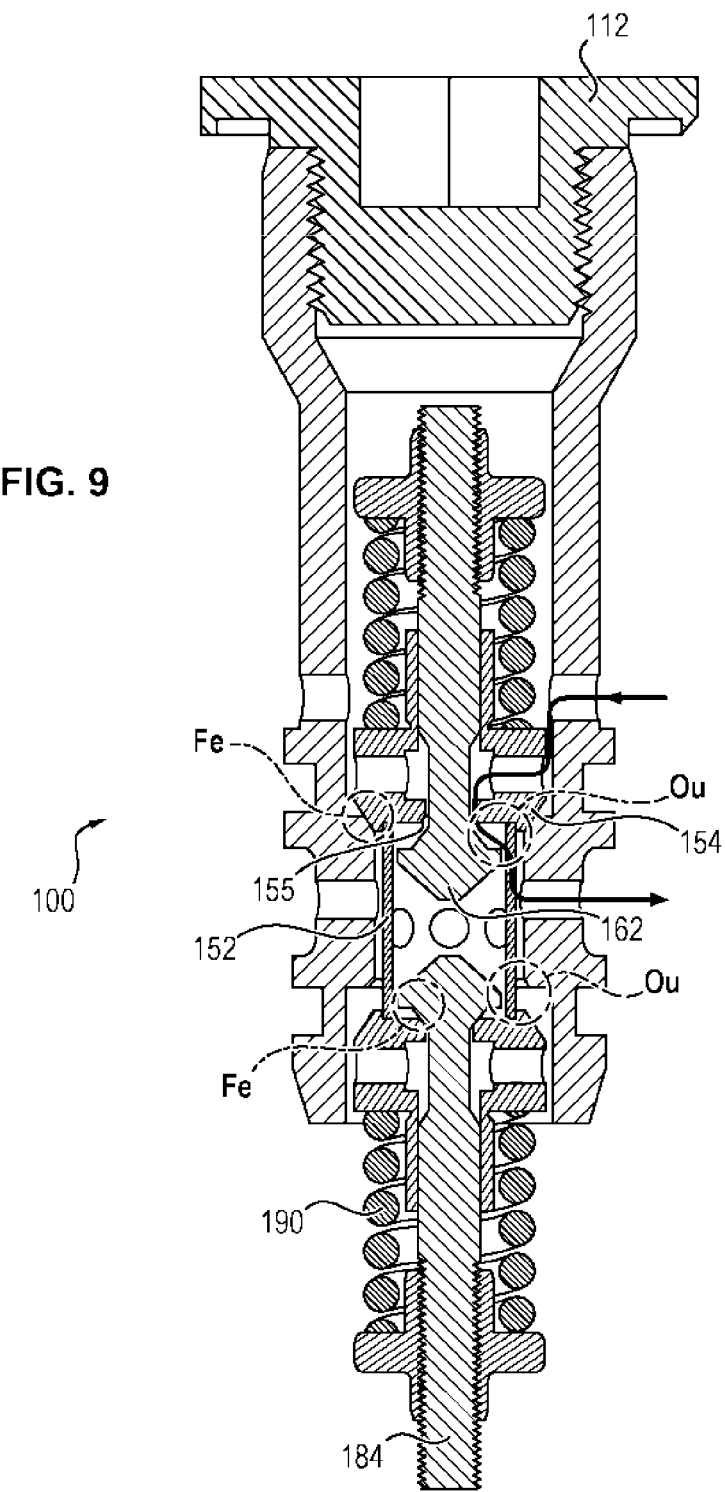
Figure 10:
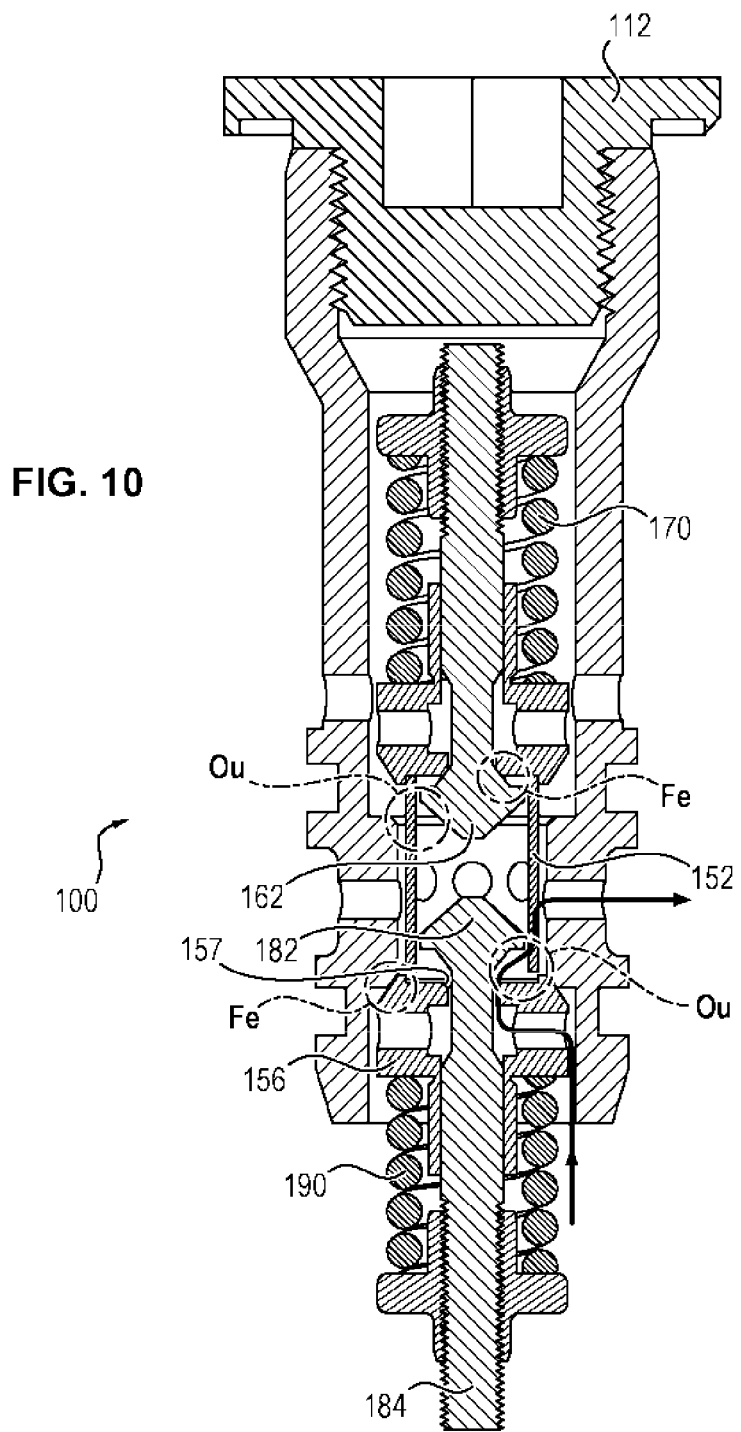

When the pressure in a line 11, 12, exceeds the calibration threshold of the pressure relief valve defined by the springs 170, 190, this excess pressure applied to the shutters 162, 182 ensures respectively the opening of the pressure relief valves, as illustrated in FIGS. 9 and 10 by the separation of the shutters 162, 182 with respect to their seats 155, 157. The corresponding excess pressure is then discharged to the booster line 10 as well as to the other supply line.

In FIGS. 7 to 10, the closed valves are denoted Fe while the open valves are denoted Ou.

It will be observed that the distance which separates, at rest, the facing ends of the two shutters 162, 182 must be sufficient to allow a sufficient movement of this shutter to allow an opening of the corresponding pressure relief valve suitable for not creating considerable head losses.

Preferably, this distance is sufficient to allow, in the case of simultaneous excess pressure on the two lines 11 and 12, a simultaneous opening of the two pressure relief valves.

In this manner, it is possible to protect the two lines 11 and 12 with respect to overpressure, in the case where the system has been in traction at a high torque, and therefore with an elevated pressure. In this case, in the case of skidding of the two axles, by decompression, one of the lines 11, 12 could expand into the other of the lines 11, 12. The two lines would be in excess pressure, which would damage the booster pump. For this particular case, it is necessary that the two pressure relief valves be able to open simultaneously.

A person skilled in the art will understand that the implementation conforming to the invention will allow all the functions to be integrated into a component in the form of a cartridge while still allowing simple and reliable adjustment, as well as independently, of the calibration of each pressure relief valve.

The invention can also be integrated or juxtaposed to one of the machines M1, M2.

Of course, the present invention is not limited to the particular embodiments which have just been described, but extends to all variants within its spirit.

The invention claimed is:

1. A pressure relief device suitable to be installed in a system comprising a first line and a second line wherein one of the first line and the second line comprises oil under pressure and comprising an auxiliary line forming a discharge line booster line, which device comprises a pressure selector in the form of a cage defining two seats and two pressure relief valves, wherein the device comprises a body comprising a casing which has a narrowed portion forming the two seats of the pressure selector on either side of a passage for connection to the auxiliary line, the pressure selector comprises a cage made by a diabolo formed from a central cylinder movable in regard of the narrowed portion of the casing, provided on two axial ends of said cylinder with respective protrusions protruding on an inner surface of said cylinder to define seats of pressure relief valves and on an outer surface of said cylinder to define selector shutters in regard of the two seats of the pressure selector formed on the narrowed portion of the casing, each pressure relief valve comprising a pressure relief shutter formed with a protrusion on one end of a rod in regard of a seat formed on a protrusion of the cage, the rods emerging, axially on each end of the pressure selector and each rod and each pressure relief shutter being biased toward a respective axial end of the device by a respective spring interspersed on the rod, between on one side a protrusion forming a selector shutter and on the other side a stop carried by the rods, and wherein said device further comprises at least one adjustment means of a pressure relief valve, disposed on the outside of an axial end of the pressure selector to allow adjustment of the calibration of the associated pressure relief valve.

2. The device according to claim 1, wherein the device comprises adjustment means respectively of each pressure relief valve disposed on the outside of the axial ends of the cage forming the pressure selector to allow independent adjustment of the calibration of each pressure relief valve.

3. The device according to claim 1, wherein each stop is adjustable in position over the length of the associated rod to define a force exerted by each spring and consequently a calibration of an opening pressure of each pressure relief valve.

4. The device according to claim 1, each stop is attached in position on its respective rod by screwing or crimping.

5. The device according to claim 1, wherein the device said narrowed portion is formed integrally on the inner surface of the casing.

6. An assistance system for a vehicle wherein said system comprises a device conforming to claim 1.

7. A vehicle equipped with a pressure relief device conforming to claim 1.

8. The device according to claim 1, wherein the cylinder and the protrusions of the pressure selector are formed of at least two parts initially separate and assembled together.

9. The device according to claim 8, wherein the central cylinder of the pressure selector comprises at least one radial through passage.

* * * * *